(12) United States Patent
Simonen (10) Patent No.: US 6,474,615 B1
(45) Date of Patent: Nov. 5, 2002

(54) PEDESTAL AND ITS USE

(75) Inventor: Antti Simonen, Keihärinkoski (FI)

(73) Assignee: Ergorest Oy, Siilinjarvi (FI)

( * ) Notice: Subject to any disclaimer, the term of this patent is extended or adjusted under 35 U.S.C. 154(b) by 0 days.

(21) Appl. No.: 09/389,466

(22) Filed: Sep. 3, 1999

Related U.S. Application Data

(63) Continuation of application No. PCT/FI98/00141, filed on Feb. 17, 1998.

(30) Foreign Application Priority Data

Mar. 4, 1997 (FI) .................................................. 963576

(51) Int. Cl.$^7$ .............................................. F16M 11/32
(52) U.S. Cl. ............................... 248/440.1; 248/309.1; 352/132; 396/428
(58) Field of Search ............................ 248/440.1, 163.1, 248/214, 309.1; 396/428; 352/132

(56) References Cited

U.S. PATENT DOCUMENTS

| | | | |
|---|---|---|---|
| 3,833,196 A | 9/1974 | Protzman | 248/208 |
| 4,615,597 A | 10/1986 | Burriss | 248/183 |
| 5,055,864 A | 10/1991 | Slikkers | |
| 5,260,731 A | 11/1993 | Baker, Jr. | |
| 5,510,863 A | 4/1996 | Kliewer | |
| 5,538,212 A | 7/1996 | Kennedy | |

FOREIGN PATENT DOCUMENTS

| | | |
|---|---|---|
| DE | 3615839 | 1/1987 |
| GB | 2232942 | 1/1991 |

*Primary Examiner*—Ramon O. Ramirez
(74) *Attorney, Agent, or Firm*—Pillsbury Winthrop LLP (57) ABSTRACT

The invention relates to a pedestal (1) for a variety of equipment, which require accurate aiming and robust mounting, especially form cameras (2) with a telephoto lens (3) and for telescopes, for fitting said equipment in a vehicular window opening (4) for facilitating the surveillance or photography performed from the vehicle. The pedestal (1) includes a base member (16) provided with one or more fastening holes (9) for an apparatus (2, 3) to be mounted on the pedestal, one end of said base member (16) being fitted with a fastening member (5) adapted to bear against the top edge of a glass panel (16) existing in a window opening (4) and the other end being fitted with a diagonal brace (20) adapted to bear at least at two points against a vehicular side surface (8) below the window opening. The invention relates also to the use of such a pedestal as a table stand, e.g. in macro-imaging, as well as to the use as an apparatus stand to be secured to various structures, such as banisters, backed chairs, and the like.

13 Claims, 6 Drawing Sheets

PEDESTAL AND ITS USE

This application is a continuation of PCT/FI98/00141 filed Feb. 17, 1998.

The present invention relates to a pedestal for a variety of equipment, which require accurate aiming and robust mounting, especially for cameras with a telephoto lens and for telescopes, for fitting said equipment in a vehicular window opening for facilitating the surveillance or photography performed from the vehicle.

The invention relates also to the use of said pedestal as a table stand, e.g. in macro-imaging, as well as to the use as an apparatus stand mountable on various structures, such as banisters, backed chairs, and the like.

U.S. Pat. No. 3,833,196 discloses a camera stand, which is intended for photographing from an automobile and which is mounted by means of two somewhat flexible/adjustable clamps on the top edge of a vehicular window while two downward extending legs of the stand bear against the side surface of the same window. The stand structure includes a hinge, which enables an adjustment of the downward extending legs to match a given curvature of the window surface. Furthermore, in another model, the downward extending legs are adapted to fasten to the side surface of a window by means of pivotable suction pads. The stand structures include adjustment links and instruments required by the system for bending the mounting heads as necessitated by the installation function. This type of stand or pedestal is not capable of carrying heavy telephoto lenses with a sufficient safety, since the window structures are subjected to an excessive stress developed by heavy-duty equipment when applying this mounting method. In view of heavy-duty equipment, the apparatus installation operations are also tedious and impractical. In addition, the window in a vehicular window opening cannot be rolled down to a sufficient depth for said mounting system in order to bring e.g. a bulky and long telephoto lens readily through the window opening into a photographing position, since the way said stand is mounted necessitates that quite a large section of the window be exposed. The structures that are flexible and individually adjustable at several points do not provide a sufficient stability for heavy photographing equipment. Another factor impeding considerably the applicability of the apparatus is that there are not many automobiles in which the top edge of a roll-down window is absolutely horizontal, as required by the mounting method of the stand. In many nature observation and photographing situations requiring speed and reliability, the mounting and use of the apparatus involving heavy equipment is all in all too slow and difficult as well as requires excessively tedious installation work in the window opening considering that the subject matter is constituted by fearful wild animals.

U.S. Pat. No. 5,055,864 discloses a stand, intended for photographing out of an automobile and constituted by an apparatus which is individually adjustable by means of screw clamps and mounted on the door of an automobile after opening the window and which bears against the automobile door surfaces from inside and outside. The photographing equipment is mounted on this stand in a balanced position, in other words, directly above the centre of the stand. This leads to instability, which in turn makes photographing with telephoto lenses considerably more difficult. Even keeping such a heavy apparatus upright upon this stand without manual support is insecure. The lower edge of an automobile door window is seldom absolutely rectangular, as required by the mounting described in the cited US patent. There are not many contact points between the stand and the door. For example, the apparatus applies the stress directly to the outside paint surface of a door, which suffers from wear, scratches, abrasions etc. caused by the dirt stuck within the mounting.

An object of the invention is to eliminate the drawbacks manifested in the prior art and to provide a pedestal, which is readily mountable in a vehicular window opening and secures a necessary stability and which, at the same time, enables the multi-dimensional use of the pedestal after local and/or technical requirements have changed in various operating situations, e.g. as the surveillance of an object's behaviour is replaced by the macro-imaging of samples.

According to the invention, this object is achieved and a pedestal of the invention is characterized in that the pedestal includes a base member provided with one or more fastening holes for an apparatus to be mounted on the pedestal, one end of said base member being fitted with a fastening member adapted to bear against the top edge of a glass panel in the window opening and the other end being fitted with a diagonal brace adapted to bear at least at two points against a vehicular side surface below the window opening.

One preferred embodiment of the invention is arranged in such a manner that the base member or the fastening member is further adapted to bear against the lower edge of a window opening. Thus, the pedestal can be used for fitting even quite heavy objects in the window opening since, in this case, the window is only subjected to a slight lateral force and major forces can be transferred to the door structure.

The pedestal of the invention is designed such that, if necessary, it can also be used as a table stand, e.g. in macro-imaging.

Preferred evolutions of the invention are set forth in the non-independent claims.

The pedestal of the invention can be fitted with any type of pedestal head (a ball joint, a kino-head, a liquid kino-head). The pedestal does not require any screw attachments or special fitting relative to the automobile, it is sufficient just to lift it into position. This is made possible by rubber-coated friction surfaces at the contact points of the pedestal and by the fact that the photographing equipment is placed on the pedestal in a so-called moment position, by virtue of which the pedestal settles tightly and firmly in place. By virtue of the pedestal, as separate mounting is not required, the photographing in various situations is quite speedy, yet reliable as far as stability is concerned.

A pedestal of the invention can be fitted on all types of automobiles without any special installation procedures, does not harm the paint surfaces of automobile doors, does not require pressing against door surfaces and, thus, no denting and wear of paint surfaces does not occur, e.g. as a result of handling heavy lenses. The stress on the window glass of an atomobile is slight as the glass has been rolled down almost completely inside the door, exposed is just a small portion of the top edge of the glass for placing thereon the rubber-coated gutter-shaped fastening member of a pedestal. The downward load caused by the pedestal can be applied to the automobile door structures, not to the window. The moment of the pedestal and equipment mounted thereon is likewise applied to the door structures as a direct compression through the intermediary of a rubber-coated friction surface.

The pedestal of the invention is particularly suitable for nature photographing with telephoto lenses; shy birds and mammals are not afraid of an automobile and, hence, photographing from one does not interfere with the activities of these animals. Likewise, for example, bird ringers and bird watchers can make their observations conveniently from an automobile by using the pedestal without scaring their target away.

Another particular advantage gained by a pedestal of the invention is the pedestal can be fitted in advance, prior to a photographing or examination process, with even a bulky apparatus for an anticipated application, since even in this case the pedestal makes it possible that an assembly mounted on the pedestal and required by a particular application can be set on or off the operating readiness with a single lifting action in a vehicle: thus avoiding situations which are caused by tedious installation processes and which disturb a target and achieving an appropriate end result for the action; this is another factor contributing to the flexibility and maneuverability of operation required by the movement of a target or other such situation factor regarding the variability of a target.

The pedestal is usable in itself as a table stand, for macro-imaging, which considerably facilitates a hobby and research activity as one and the same pedestal can be used e.g. as an automobile stand for the research/observation of owl birds in the wild with a telescope, for photography, for video-photography in a similar situation, as well as for other dimensions, such as for the macro-imaging of research samples (e.g. vomit balls), for the same subject-matter philatelic macro-imaging from postage stamps etc. dealing with owl birds, without having to acquire a separate pedestal for each special occasion. The installation and use of a per se known tripod in macro-imaging as it necessitates that the centre post of an otherwise functioning tripod be turned upside down or a like procedure, nor is the mounting thereof on a base non-problematic in view of long photographic exposure times and other working stability, in addition to which the aiming in preparation for focusing is quite difficult with such a tripod in this type of photographing situation. A prior known type of reproduction pedestal is also useful in such a special situation, although unnecessarily massive for this particular purpose and therefore inconvenient to handle, carry along, store etc., in addition to which the apparatus is quite expensive. The pedestal of the invention covers as such also the described special field and it is also readily mountable on a base (table top) by means of a screw clamp, when special stability is required particularly for working and/or long exposure times.

The adaptability of a single pedestal simultaneously in various sectors of a multi-dimensional activity has significance especially for the reason that research and advanced hobby have already been a long time chained and specified in terms of the focal areas thereof in such a way, for example, that owl research comprises not only the general reasearch of a bird species but also the food biology of owl birds, extending to the level of small mammals, a consequence of which is in turn that the research field extends to the food research area for these mammals, covering insects, plants, etc., which in turn requires an easy transition in research photographing processes from teletechnology to macro-technology—a host of portable pieces of equipment, e.g. in the form of several tripods or pedestals, becomes a factor seriously affecting the operation, especially when the operation requires the above-mentioned ample, even geo25 graphical mobility and the immediate photographic action and the switching of a photographing technique. The same demand exists also in a more narrow field: the target being a bird/mammal, parasites stuck with a host animal, etc.

Photographing and nature watching can be done conveniently from an automobile even in foul weather. Versatile event photography from an automobile will be possible by virtue of the easy and quick applicability of the pedestal and also for the reason that, due to its compact size, the pedestal can be handily carried along.

The invention will now be described by way of example in more detail with reference made to t he accompanying drawings, in which.

Figure 1:
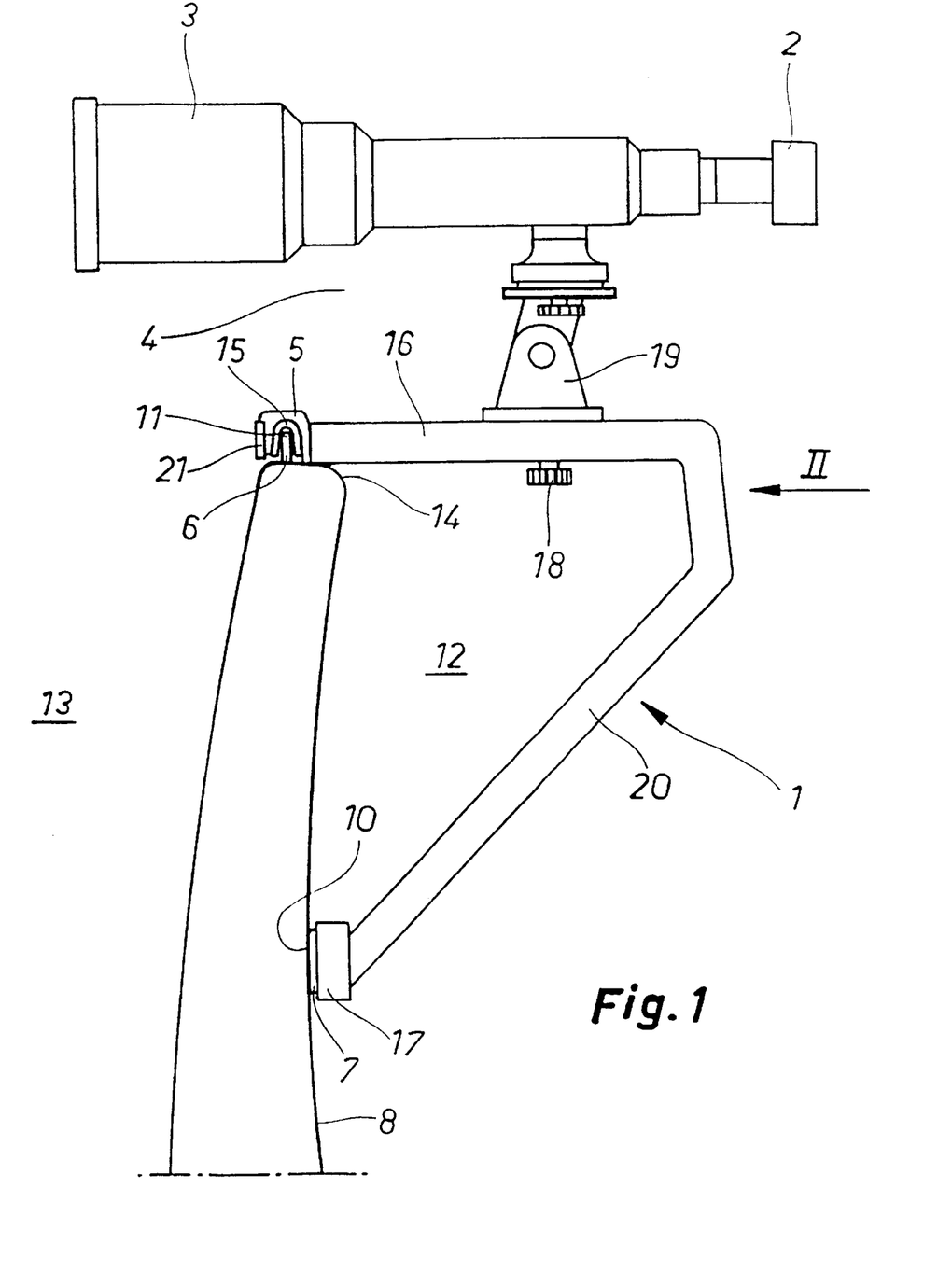
FIG. 1 shows a pedestal of the invention in a schematic side view, the pedestal being fitted in its operating position and a camera with its telephoto lens mounted in place on the pedestal.
Figure 2:
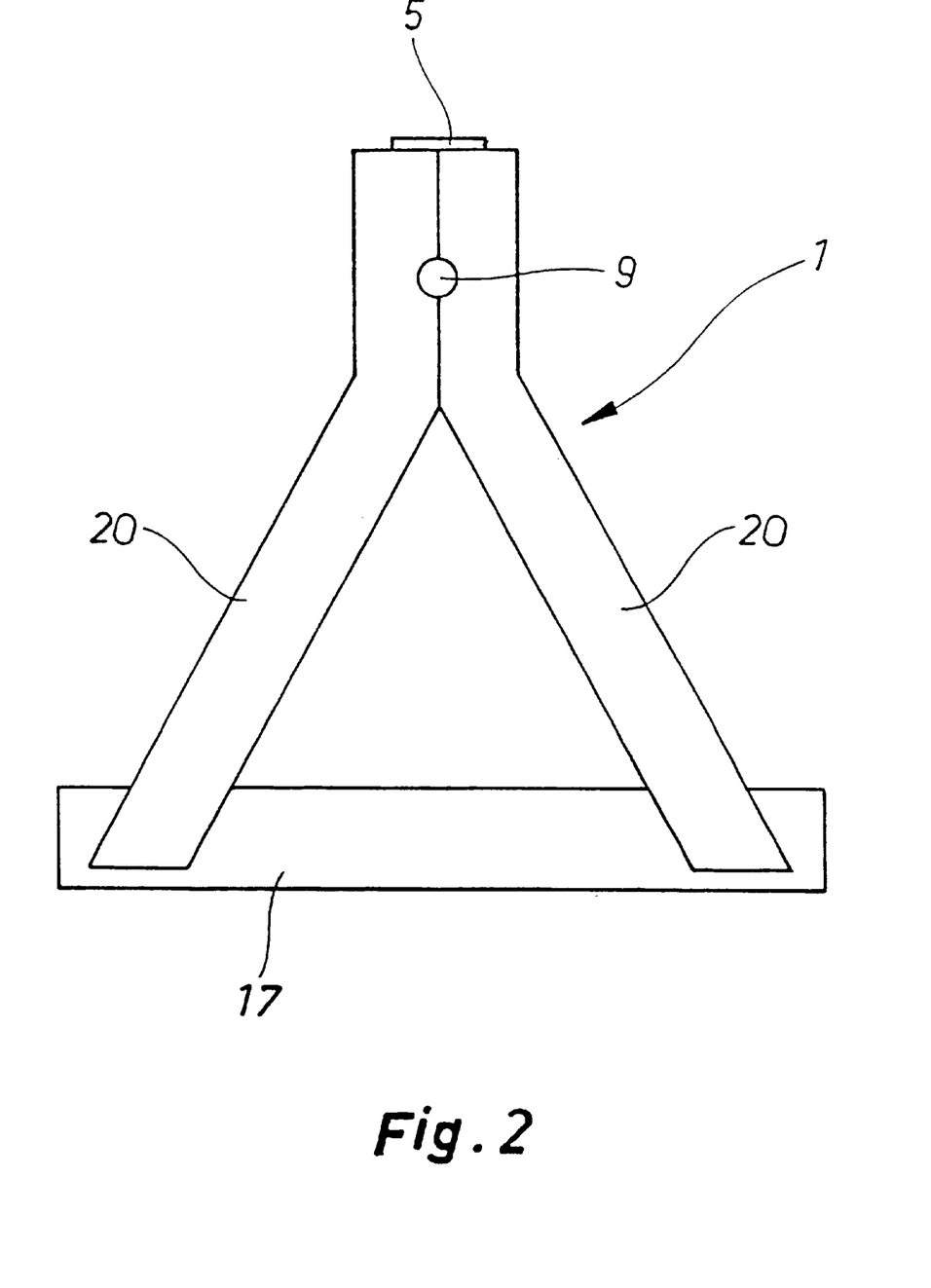
FIG. 2 shows a pedestal of the invention in a side view (without a camera) in the direction of an arrow II in FIG. 1.

FIG. 1 illustrates schematically a pedestal 1 of the invention for equipment requiring an accurate aiming and a solid mounting, FIG. 1 showing, as an example of such equipment, a camera 2 provided with a telephoto lens 3 for fitting said equipment in a vehicular window opening 4 for facilitating the surveillance or photography carried out from a vehicle.

The pedestal 1 is constructed as a shelf-like bracket, which in the example of FIG. 1 includes a base member 16 constituting the actual mounting for an apparatus to be fastened to the pedestal and being more or less horizontal in its operative position, said base marmber, in the example depicted in the drawing, including of a cross-sectionally rectangular tube provided with fastening holes 9 for an apparatus 2, 3 to be mounted on the pedestal 1.

The base member 16 has one of its ends, the left-hand end in FIG. 1, fitted, e.g. by welding, with a fastening member 5 constituted by a downward open trough-like element. As for its opposite end, the base member 16 is designed to first extend approximately straight down and to continue then diagonally downwards as two diagonal braces 20. At the bottom end thereof, the diagonal braces 20 are linked in a per se known manner to each other through the intermediary of a connecting piece 17.

The trough-like element 5 has its inner surface lined with a rubber or plastic coating 15 and it is dimensioned in such a manner that the top edge of a glass panel 6, which is included in a vehicular window opening 4 and rolled down most of the way, is capable of keying itself inside the trough-like element 5. When the glass 6 is lowered such that the bottom edge of the trough-like element 5 or the bottom surface of the base member 16 settles against a bottom edge 14 of the window opening 4, the glass will only be subjected to a lateral force while the bottom edge 14 of the window opening 4 takes up the vertical forces.

The trough-like element 5 has also its outer surface facing away from the base member 16 lined with a rubber or plastic coating 21 for cushioning eventual colliding contacts. The rubber or plastic coating 21 of the trough-like element 5 cushions colliding contacts of the pedestal 1 in an effort to protect the glass 6 and to avoid startling of fearful wild animals as a result of creating a sharp, unintentional noise substantially different from those produced by nature, the noise being produced by contacts between the glass 6 serving as a mounting and the trough-like element 5 serving as a fastening head and made e.g. of a metal—a potential hazard, especially in situations in which the pdestal 1, in anticipation of action readiness, is fitted with a heavy apparatus, e.g. a telephoto lens 3.

As for its bottom end, the pedestal is propped against a side surface 8 of the door of a vehicle through the intermediary of a horizontal connecting piece indicated by reference numeral 17 or, as shown in the drawing, preferably two spaced a part rubber- or plastic-coated abutment pads 7.

It is usually most preferable to adapt the pedestal 1 to protrude into a vehicle interior 12, the abutment pads 7 resting against the inside door surface, which is usually provided with a plastic or fabric lining and hence less susceptible to damages than the paint job on the outside door surface. However, the stress caused on the paint surface by the pedestal 1 of the invention, when the pedestal is used outside 13 of the door, is nearly non-existent—especially if the paint surface is clean since the abutment pads 7 press almost orthogonally against the door surface and—especially if the pedestal is sufficiently rigid—no abrasive movement occurs between the door surface and the abutment pads 7.

Thus, upon lifting it in place, the pedestal 1 is on the one hand adapted to clamp through the intermediary of the fastening member 5 included in the pedestal 1 onto the top edge of the glass 6 existing in the window opening 4, the fastening member 5 being possibly also adapted to bear against the bottom edge 14 of the window opening 4 and, on the other hand, to bear, through the intermediary of the abutment pads 7 included in the pedestal 1, against the side surface 8 of a vehicle below the window opening 4. The attachment provided by the fastening member 5 is in principle a 1-point attachment, whereby the mounting, e.g. the top edge of glass 6, need not be horizontal.

The fastening holes 9 included in the pedestal 1 are spaced from a plane connecting attachment points 10, 11 between the pedestal 1 and a vehicle, such that the forces produced by the apparatus 2, 3 mounted on the pedestal 1 at the attachment or contact points 10, 11 between the pedestal 1 and a vehicle are parallel to the forces produced by the pedestal 1 alone.

Figure 3:
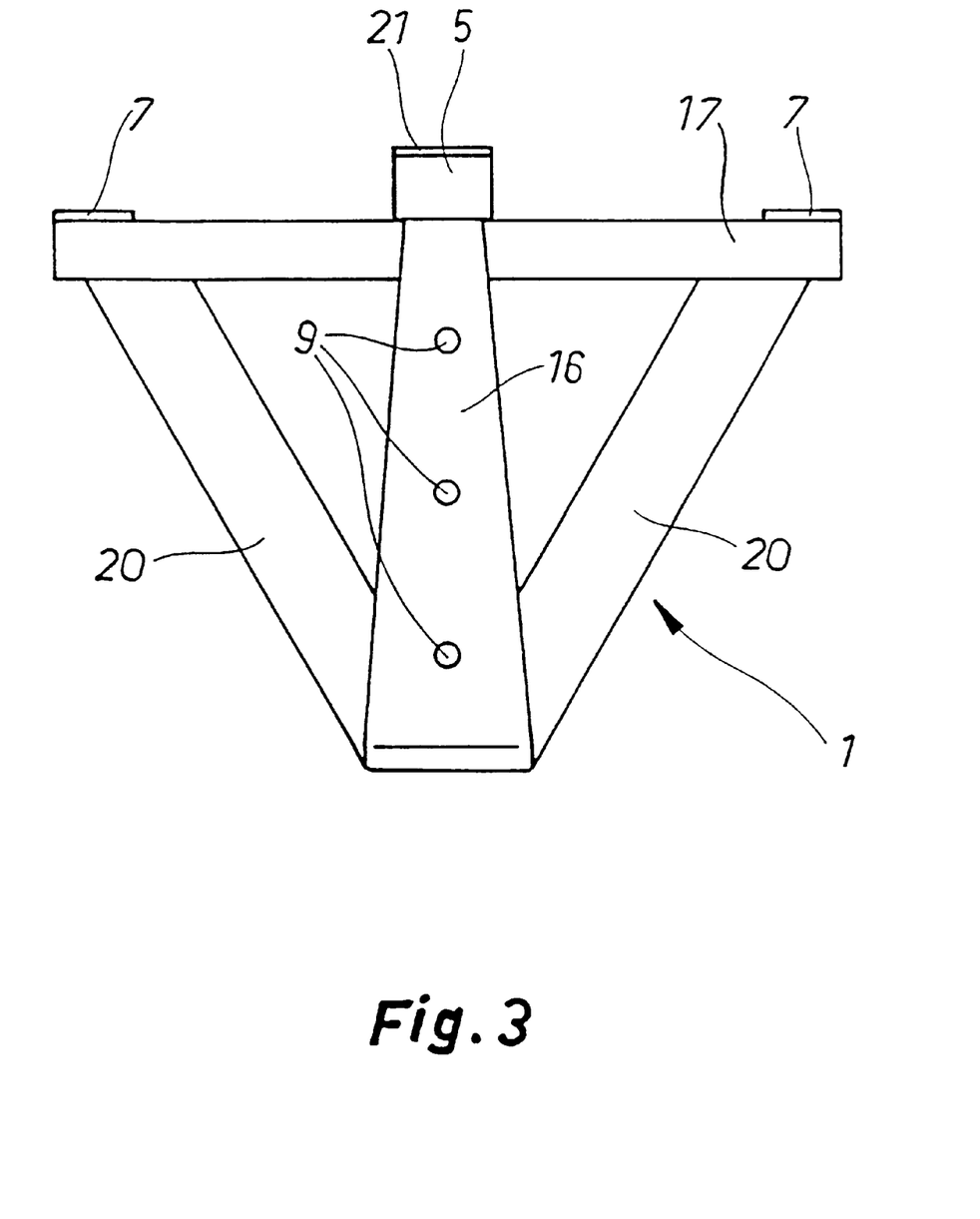
FIG. 3 shows a pedestal of the invention in a plan view.
Figure 4:
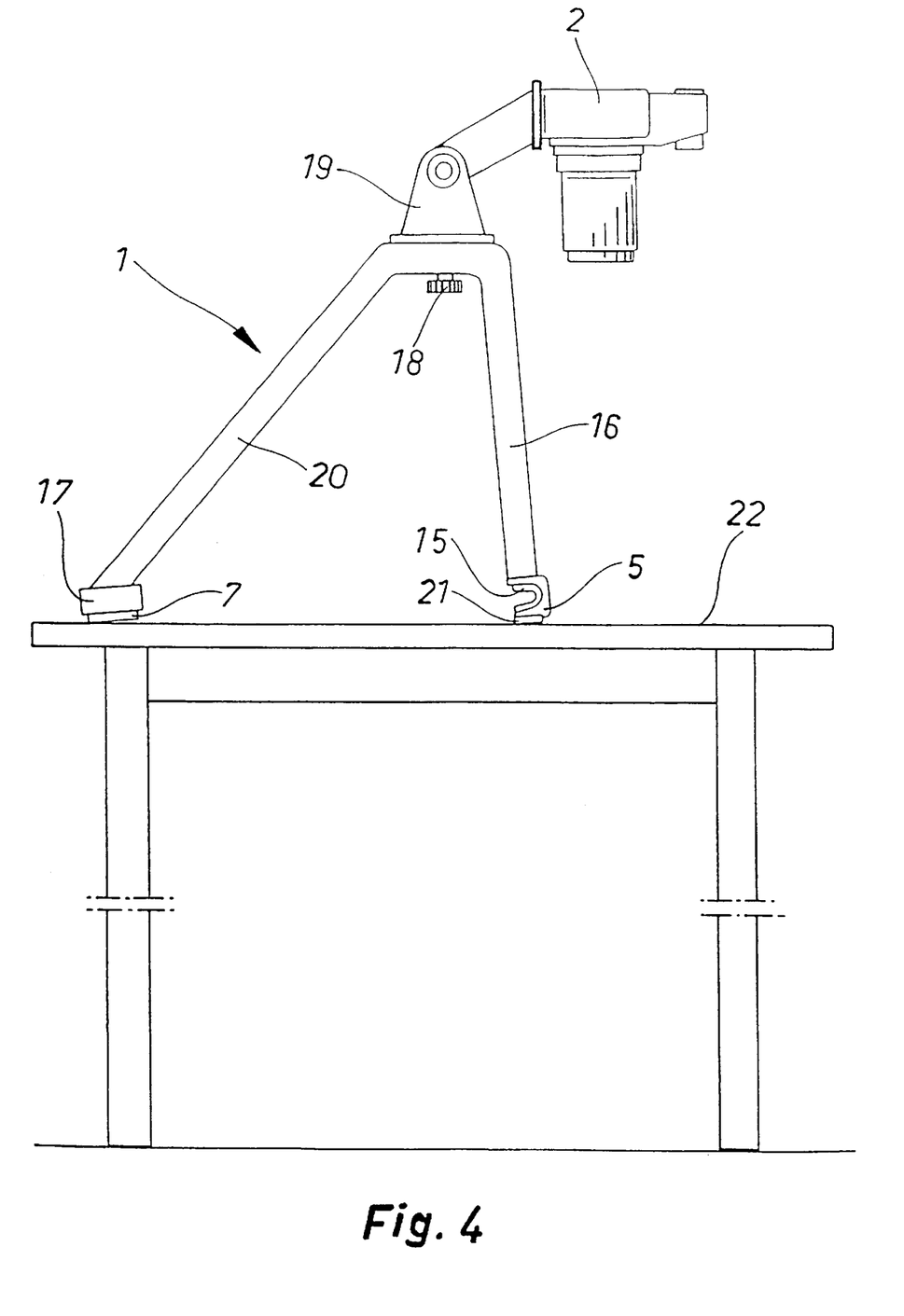
FIG. 4 shows the use of a pedestal of the invention as a table stand.

In the example of FIGS. 3 and 4, the number of fastening holes 9 is four, the most appropriate one being selectable for a given application. The actual attachment to the pedestal 1 is carried out by means of a screw 18 extended through the hole 9 by tightening an apparatus to be mounted, usually by means of a suitable pedestal head 19.

Figure 6:
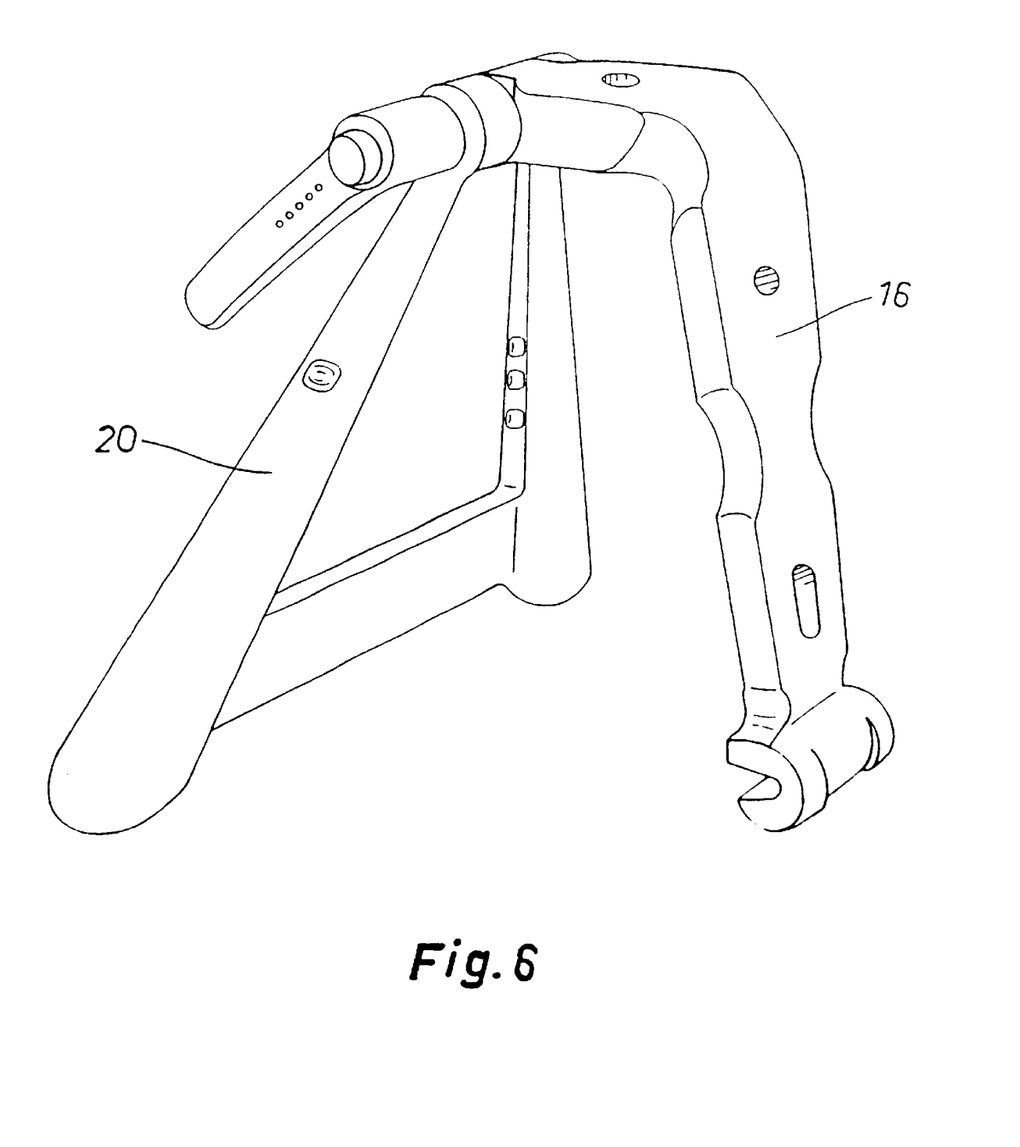
FIG. 6 shows a pdestal according to the second embodiment of the invention in a perspective view.

The invention has been described and explained above with reference to just one preferred embodiment thereof. However, it is self-evident for a skilled person that the invention defined in the appended claims can be subjected to a multitude of variations without departing from the fundamental inventive concept. Thus, the attachment point between the pedestal 1 and the pedestal head 19 can be located at a level substantially below the top edge of the glass 6, e.g. by means of an echelon included in the pedestal 1. The attachment point can be steplessly adjustable in vertical direction. Between the base member 16 and the diagonal braces 20 can also be provided an articulated joint for establishing an optimal position for the pedestal (FIG. 6). The articulated joint also facilitates the storage of a pedestal, as the pedestal can thus be brought to a condition as compact as possible.

The pedestal of the invention is also functional in table/macro-imaging upon setting and lifting the pedestal on a horizontal level 22 to rest upon the abutment pads 7 and the collision cushion 21, the latter serving now as support and friction points for the pedestal in this functional position. For particularly secure, stable working and/or for long exposure times the pedestal 1 can be fastened to the level 22 by means of a screw clamp from the tube 17.

Figure 5:
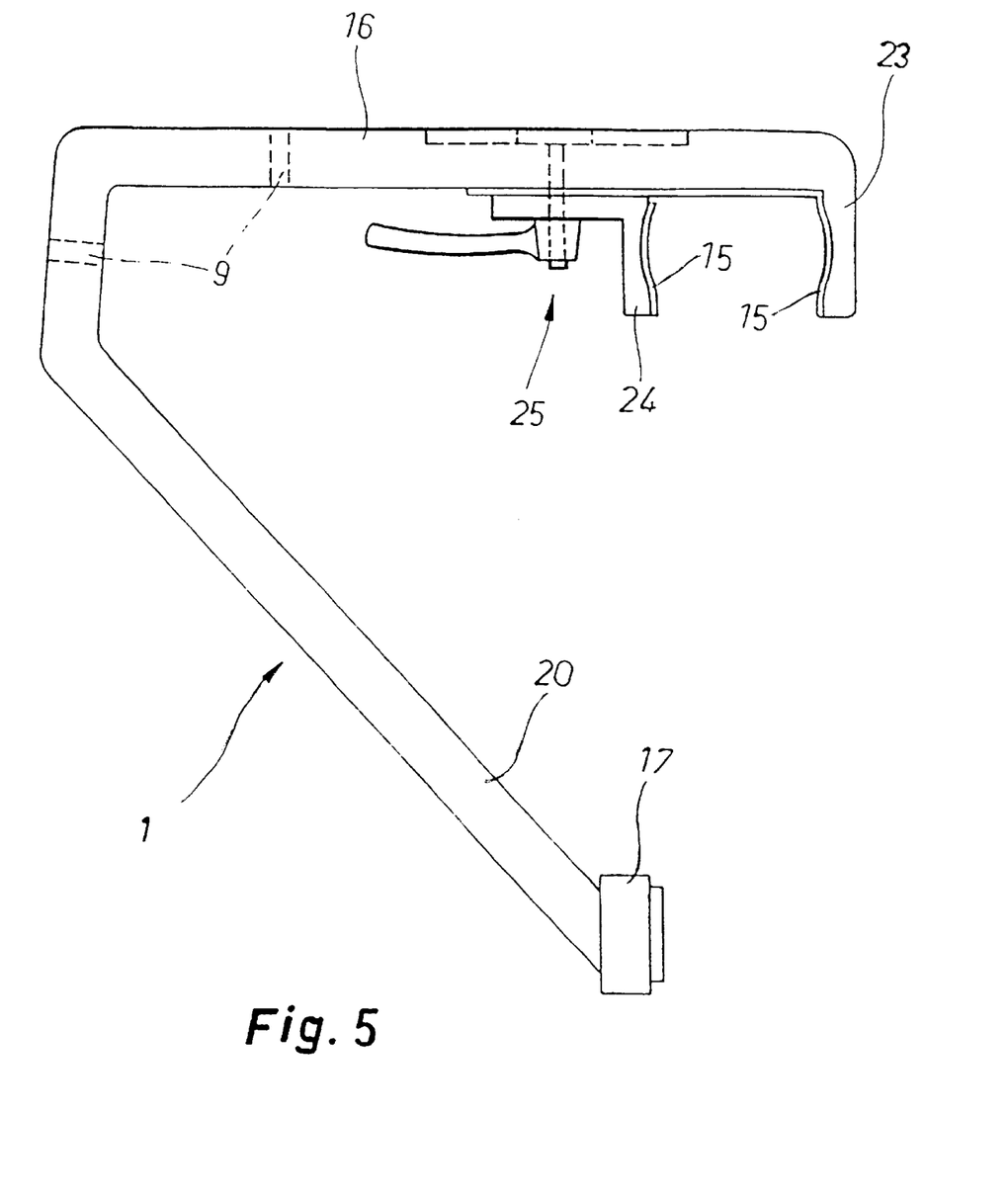
FIG. 5 shows a pedestal according to a second embodiment of the invention in a schematic side view.

FIG. 5 shows the pedestal 1 according to a second embodiment of the invention. There, the fastening member 5 includes a fixed jaw 23 and an adjustable jaw 24, said adjustable jaw 24 being adapted to be locked by means of a clamp member 25 at a desired distance from the fixed jaw 23. Such a prior known adjustable jaw 24 can be used for expanding the range of application of the pedestal 1, whereby the pedestal 1 can be mounted not only on glasses of highly diversifed thicknesses but also on various structures, such as banisters, backed chairs, etc. The usefulness of the pedestal 1 for various applications can be further increased, e.g. by making the base member 16 adjustable in length. The diagonal brace 20 may also be adjustable in length.

What is claimed is:

1. A pedestal for mounting and supporting equipment, said pedestal including:
   a base member including at least one fastening hold for mounting the equipment, a first end of the base member including at least one diagonal brace having at least one bearing point and a second end of the base member including a fastening member,
   wherein, in a first mode of operation, the pedestal supports the equipment in a vehicular window opening in which at least one bearing point of the diagonal brace bears against a vehicular side surface below the window opening, the fastening member bears substantially at a single point against a top edge of a glass panel in the window opening, and at least one of the fastening member and the base member bears against a bottom edge of the window opening, and
   wherein, in a second mode of operation, the pedestal supports the equipment on a substantially flat horizontal surface in which the fastening member and the at least one bearing point of the diagonal brace supports the pedestal on the substantially flat horizontal surface when the pedestal is used as a table stand, and
   wherein the equipment is mounted to a transition portion between the diagonal brace and the base member when the pedestal is in the second mode of operation.

2. A pedestal as set forth in claim 1, wherein the equipment includes a camera.

3. A pedestal as set forth in claim 2, wherein the camera includes a telephoto lens.

4. A pedestal as set forth in claim 1, wherein the equipment includes a telescope.

5. A pedestal as set forth in any one of claims 1–4, herein the pedestal is adapted to extend at least one of internally of the vehicle and externally of the vehicle.

6. A pedestal as set forth in any one of claims 1–4, wherein the fastening member includes a trough-like element.

7. A pedestal as set forth in claim 6, wherein the fastening member includes a fixed jaw and an adjustable jaw, said adjustable jaw being adapted to be locked by a clamp member at a desired distance from the fixed jaw.

8. A pedestal as set forth in claim 7, wherein the trough-like element has an inner surface and an outer surface facing away from the base member, said trough-like element being lined with at least one of a rubber and a plastic coating.

9. A pedestal as set forth in claim 6, wherein the trough-like element has an inner surface and an outer surface facing away from the base member, said trough-like element being lined with at least one of a rubber and a plastic coating.

10. The use of a pedestal as set forth in any one of claims 1–4, as an apparatus stand to be secured to various structures, including at least one of a banister and a backed chair.

11. The use of a pedestal as set forth in claim 6, as an apparatus stand to be secured to various structures, including at least one of a banister and a backed chair.

12. The use of a pedestal as set forth in claim 5, as an apparatus stand to be secured to various structures, including at least one of a banister and a backed chair.

13. A pedestal for mounting and supporting equipment, said pedestal including:
- a base member including at least one fastening hole for mounting the equipment, a first end of the base member including at least two diagonal braces with respective bearing points and a second end of the base member including a fastening member,
- wherein the pedestal supports the equipment in a vehicular window opening in which the bearing points of the at least two diagonal braces bear against a vehicular side surface below the window opening, the fastening member bears substantially at a single point against a top edge of a glass panel in the window opening, and at least one of the fastening member and the base member bears against a bottom edge of the window opening.

* * * * *